United States Patent Office 2,765,335
Patented Oct. 2, 1956

2,765,335

PRODUCTION OF ORTHO-CRESOL FROM 6-CHLORO-ORTHO-CRESOL

Joseph Horsefield Brown, Widnes, England, assignor to Imperial Chemical Industries Limited, a corporation of Great Britain No Drawing. Application December 11, 1952,
Serial No. 325,443

Claims priority, application Great Britain
December 28, 1951

5 Claims. (Cl. 260—621)

This invention relates to the production of organic compounds and especially to a process for the recovery of cresols from by-product chlorocresols.

In a usual method of preparation of 2-methyl-4-chlorophenoxyacetic acid, monochloro-o-cresol is condensed with monochloroacetic acid in aqueous alkaline medium, the chlorocresol being normally obtained by chlorinating molten o-cresol to the monochloro stage. This chlorocresol in its crude form contains about 65% of the 4-chloro- and 35% of the 6-chloro-isomers, there being also present in the latter small amounts of unreacted o-cresol and dichlorocresols. The crude mixture may either be directly condensed with monochloroacetic acid, in which case the product will contain a quantity of the undesired 2-methyl-6-chloro-phenoxyacetic acid, or alternatively the 6-chloro-o-cresol may be removed before the condensation and the relatively pure 4-chloro-o-cresol condensed with monochloroacetic acid.

Even though it involves the additional stripping step, the latter process nevertheless has certain advantages, notably that there is no waste of monochloroacetic acid in the formation of undesired material, and that the final product is free from such material. On the other hand, the stripping process results in the accumulation of large quantities of by-product 6-chloro-o-cresol.

We have now found that cresol can be practically quantitatively recovered from such unwanted chlorinated cresol by treatment of the latter with hydrogen at elevated temperature in presence of a suitable catalyst. The recovered cresol can then be re-used: for example, it can be again chlorinated and employed in the process for the production of 2-methyl-4-chloro-phenoxyacetic acid, and it is thus possible to run this process as a continuous cycle of operations without any loss of raw material other than the normal small losses involved in the commercial operation of the various steps.

According to the invention, therefore, cresol is recovered from chlorinated cresol by a process which comprises treating the chlorocresol vapour with excess of hydrogen at elevated temperature in presence of a suitable vapour phase hydrogenation catalyst as hereinafter defined. The process is particularly adapted to the treatment of monochloro-o-cresols.

A further feature of the invention lies in the combination of this process with the process of manufacture of 2-methyl-4-chloro-phenoxyacetic acid. There is thus provided an improved method of manufacture of 2-methyl-4-chloro-phenoxyacetic acid which includes the steps of chlorinating o-cresol to the monochloro stage, isolating from the product a fraction containing substantially 4-chloro-o-cresol, condensing the latter with monochloroacetic acid, recovering the o-cresol from the 6-chloro-o-cresol fraction by catalytic hydrogenation, and returning the recovered o-cresol to the chlorination step.

The reaction conditions for the hydrogenation are advantageously those which allow essentially complete removal of the chlorine from the chlorocresol to be effected, and by a suitable vapour phase hydrogenation catalyst we mean one which is sufficiently active to bring this about without at the same time causing breakdown of the benzene ring. For example, platinum, palladium, silver, nickel and copper are all well-known vapour phase hydrogenation catalysts and may be used in the present reaction. Their activity varies considerably, however, and it will be appreciated that the reaction temperature is adjusted according to the type of catalyst employed. With the less active copper, for instance, the reactants must be maintained at a higher initial temperature than is the case with nickel. Nickel indeed has been found to be particularly suitable and to possess an appropriate degree of activity. The nickel is conveniently supported on a refractory material such as certain aluminium or silicon compounds, and the catalyst may be prepared in situ by known methods. It can for instance be made by impregnating or coating the support with an oxide or salt of nickel and reducing the said oxide or salt by means of a current of hydrogen at elevated temperature.

The reaction between hydrogen and chlorocresol is exothermic and it is observed that it produces a local rise in temperature or hot spot which gradually moves along the catalyst bed. Nevertheless it is necessary to preheat the reactants and maintain them at an appropriate initial temperature, conveniently by surrounding the reaction vessel with a jacket or bath containing a suitable heat transfer agent. The preferred temperature ranges given in the descriptive matter and example which follows therefore relate to the temperature of the bath surrounding the reaction zone and not to the actual reaction temperature. Furthermore, such bath temperatures are primarily suitable for reactors of small cross-section, that is, not more than about ten square inches, and must be taken to refer to these.

In one form of the invention the hydrogenation step is carried out in the following way. Alumina granules coated with nickel oxide or nickel chloride are placed in a tubular reactor which is surrounded by a bath containing a suitable material for maintaining the catalyst bed at constant temperature. This may consist of any substance or substances commonly used for this purpose. The bath is heated to the temperature necessary for reduction of the nickel compound to nickel, and a constant stream of hydrogen is passed through the reactor until the reduction is complete. A mixture of monochloro-o-cresol vapour and excess hydrogen is then fed into the reactor, which is maintained at a temperature in the range 300° to 350° C. Practically complete removal of chlorine takes place, and the gaseous product emerging from the reactor consists almost wholly of o-cresol, hydrogen chloride, and unreacted hydrogen. This is passed through a condenser where the o-cresol is separated, while the gaseous effluent, after removal of suspended organic material, is scrubbed with water to remove hydrogen chloride.

According to a further embodiment of the invention this process for the recovery of o-cresol is incorporated with the known process for the production of 2-methyl-4-chloro-phenoxyacetic acid.

The crude mixture of monochlorocresols is first prepared by passing approximately one molecular equivalent of gaseous chlorine into the stirred molten o-cresol. After the desired degree of chlorination has been effected, the crude product is subjected to fractional distillation at reduced pressure. The first main fraction consists of 6-chloro-o-cresol together with any unreacted o-cresol, and when the boiling point begins to rise sharply the distillation is interrupted. The undistilled residue consists substantially of 4-chloro-o-cresol, but there is also present a small proportion of dichlorocresol and other impurities. This residue may if desired be further purified by distillation.

The relatively pure 4-chloro-o-cresol is condensed in the usual way with monochloroacetic acid by refluxing in presence of an aqueous solution of caustic alkali. Isolation of the acid from the product and the preparation of derivatives therefrom may be carried out by known methods as, for example, by the method described in British patent specification No. 664,069.

The distillate from the stripping process, which is substantially 6-chloro-o-cresol, is then hydrogenated as described above, the o-cresol being recovered almost quantitatively. This, together with fresh o-cresol as required, is melted and again chlorinated to the mono-chloro stage and the cycle of production may be repeated at will.

After some time the catalyst begins to lose its activity owing to the deposition thereon of organic matter and carbon, and the proportion of cresol in the product correspondingly falls. Nevertheless such a product containing minor amounts of chlorocresol is useful for return to the chlorinator in the cyclic process for the manufacture of 2-methyl-4-chlorophenoxyacetic acid described above. Analysis of the product for cresol content acts as a convenient guide to the state of activity of the catalyst, and when the percentage of cresol drops below a predetermined figure it is desirable to regenerate the poisoned catalyst. This can readily be carried out without removal from the reactor by heating in air to burn off the organic matter and then reducing the nickel oxide which has been formed during the oxidation, and the regeneration may be carried out any number of times.

Rough methods of estimating the cresol content of the product, which are suitable for process control, consist of measurements of its density and setting point, and these may be taken at regular intervals and compared with the density/composition or setting point/composition curves for o-cresol/6-chloro-o-cresol, the reaction being stopped when the percentage of cresol has reached the predetermined lower limit.

The total life of the catalyst has no definable limit and must obviously be connected with its physical stability at the temperatures involved. The most satisfactory and long-lived catalysts consist of discrete particles which have no tendency to become powdery on heating.

It must be understood that it is not possible to give a range of bath temperatures which will be suitable for all catalysts, since the reaction temperature, and hence the bath temperature, is bound up with the activity of the catalyst. In the case of a nickel catalyst, however, the temperature of the bath surrounding the reactor is advantageously at least 300° C. and preferably between 315° and 350° C. At bath temperatures below 300° C. cresol formation is only partial, while at very high temperatures the cycle life of the catalyst is drastically reduced. We have found that using nickel supported on alumina as catalyst the bath temperature which results in the most satisfactory combination of good yield, high quality product and long catalyst cycle life is about 335° C.

In order to attain a high percentage removal of chlorine from the chlorocresol, the hydrogen should be in excess of the stoichiometric amount and the molar ratio of hydrogen to chlorocresol is preferably about 5:1. Ratios lower than this will result in a product contaminated to some extent with unreacted chlorocresol, while higher ratios are uneconomic.

The time of contact between the reactants and the catalyst is not particularly critical and its optimum value will obviously vary according to the activity of the catalyst and the temperature of the reaction. The cycle life of the catalyst may also vary considerably with small variations in the reaction conditions.

Instead of using a static bed of catalyst the reaction can also be effected by means of a boiling bed.

Although the invention has been described with particular reference to the reduction of 6-chloro-o-cresol, it is to be understood that it is not limited to this reaction and other chlorinated cresols may also be effectively reduced in this way.

The following example illustrates but does not limit the invention:

*Example*

The apparatus consisted of a mild steel tubular reactor, one inch in diameter and 43″ in length, the catalyst bed length being about 30″. This was surrounded by a salt bath containing equal weights of potassium nitrate and sodium nitrite and heated by means of an electric furnace, the temperature of the bath being controlled by a thermocouple connected with a temperature controller.

Before entering the reactor both the hydrogen and the chlorocresol were passed through a preheater at a temperature sufficient to ensure complete vaporisation of the organic material. The other end of the reactor was directly connected to a Vigreux condenser and connections led from this to a fog trap and a scrubber for the hydrogen chloride.

The catalyst material, consisting of 420 ml. (431 g.) of 20% nickel oxide on alumina granules, was charged into the reactor and the preliminary reduction carried out by heating the bath to 335° C. and passing over the hot material a constant feed of 50 litres per hour of hydrogen. After 8 hours the catalyst was completely reduced and the chlorocresol feed was then turned on and the hydrogen/chlorocresol ratio was adjusted to 5:1, the chlorocresol and hydrogen being fed at rates of 59 g./hr. and 50 litres/hr. respectively. The chlorocresol fraction contained 85% by weight of 6-chloro-o-cresol and 15% by weight of o-cresol. The space velocity in hour $^{-1}$ was about 300 at the operating temperature and pressure. It was found that the best yield of product was obtained when the chlorocresol feed was not more than 1 gram mol. per litre of catalyst per hour.

Samples of the product which collected in the condenser were periodically examined for density and setting point in order to follow the course of the conversion of 6-chloro-o-cresol to o-cresol, and the hydrogen chloride formed was absorbed in water and estimated by titration with alkali. During the first 54 hours of the run, whilst 3200 g. of the chlorocresol were passed through the reactor, 2545 g. of organic product and 645 g. of hydrogen chloride were obtained and the o-cresol content of the organic product collected over the period averaged 95%.

After this period the catalyst began to show signs of poisoning and the percentage of o-cresol in the product gradually fell. When the product is required for use in the cyclic process for the production of 2-methyl-4-chlorophenoxyacetic acid, a certain amount of chlorocresol in the product may be tolerated, and the hydrogenation may be carried on to say an o-cresol content of 80%, but it will be appreciated that the stage to which the hydrogenation is carried depends upon what is to be done with the product.

At the end of the reaction the hydrogen feed was continued for about an hour and, after removing all residual hydrogen with nitrogen, the catalyst was heated in a current of air for 8 hours to burn off the carbon. The apparatus and catalyst were again purged with nitrogen and the oxidised catalyst was reduced for a further 8 hours with hydrogen as in the initial reduction, after which the chlorocresol treatment was repeated. The bath temperature was kept at 335° C. for all operations.

What I claim is:

1. A process for the recovery of o-cresol from 6-chloro-o-cresol comprising reacting said chlorocresol in the vapor phase at substantially atmospheric pressure in the presence of a molar excess of hydrogen in the presence of nickel, said nickel being heated by a bath maintained at a temperature of from about 300° to about 350° C.

2. The process of claim 1 wherein said hydrogen is present in a ratio of hydrogen to said chlorocresol of about 5:1.

3. A process according to claim 1 in which the catalyst is active nickel supported on granular alumina.

4. A process according to claim 1 in which the catalyst is heated by means of a bath maintained at a temperature between 315° C. and 350° C.

5. A process according to claim 1 in which the catalyst is regenerated after use by heating it in presence of oxygen to remove carbon deposited thereon and reducing the nickel oxide so formed by heating in a current of hydrogen.

References Cited in the file of this patent

UNITED STATES PATENTS

| | | |
|---|---|---|
| 2,369,197 | Winkler et al. | Feb. 13, 1945 |
| 2,485,146 | Foster | Oct. 18, 1949 |
| 2,560,950 | Head | July 17, 1951 |
| 2,646,446 | Britton et al. | July 21, 1953 |

OTHER REFERENCES

Kelber: Ber. Deut. Chem., vol. 50, pp. 305–310 (1917), 6 pp.

Ellis: Hydrogenation of Organic Substances (3rd ed., 1930), p. 305 (1 p. only), publ. by Van Nostrand Co., N. Y.